Feb. 2, 1926.  
J. F. O'CONNOR  
1,571,682  
FRICTION SHOCK ABSORBING MECHANISM  
Filed Sept. 16, 1922  3 Sheets-Sheet 2
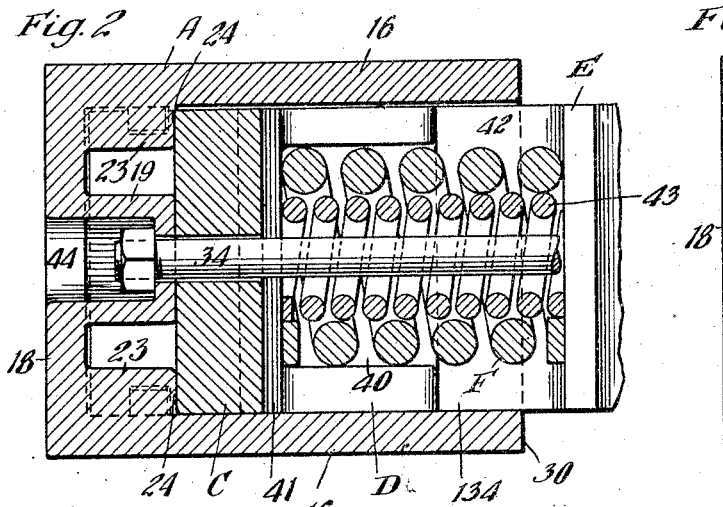
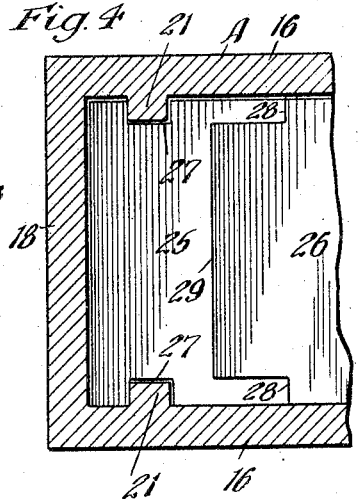
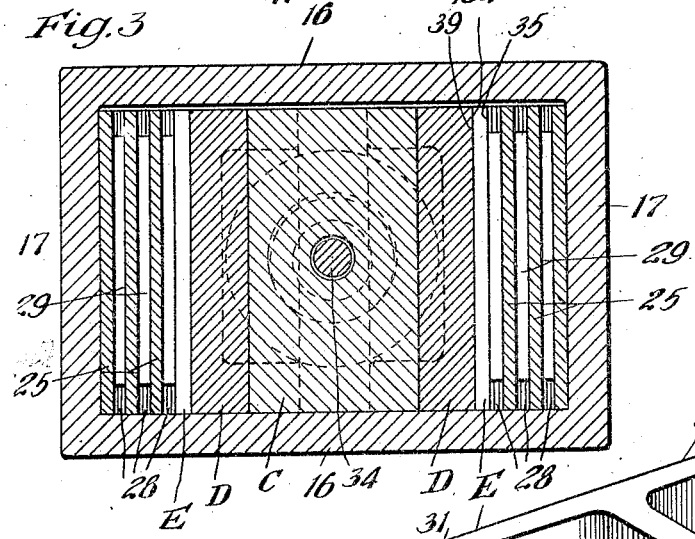
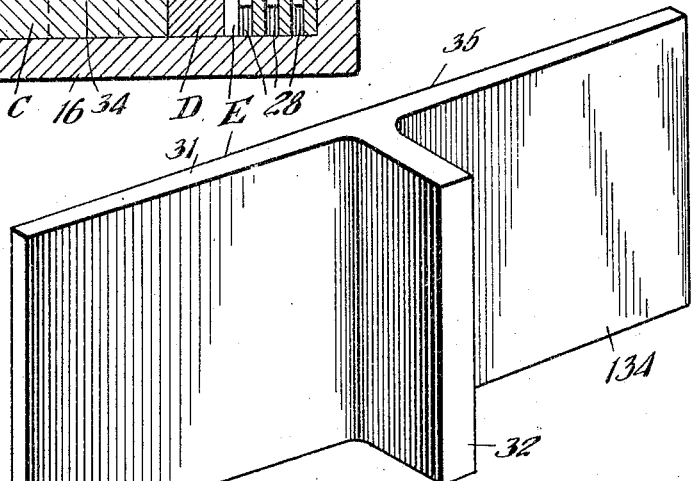
Witnesses  
Wm. Geiger  
Inventor  
John F. O'Connor  
By Geo. J. Haight  
His Atty.

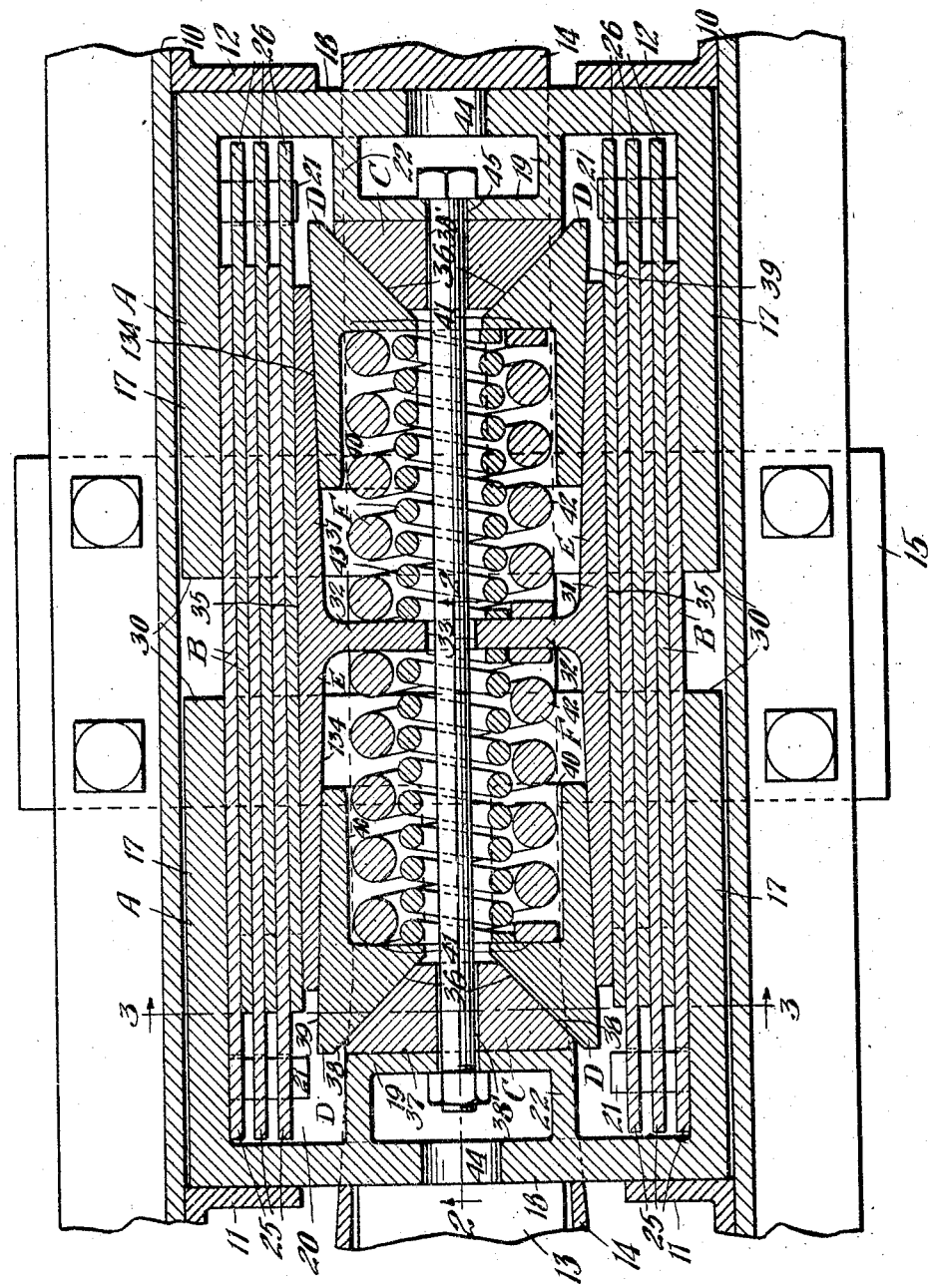

Feb. 2, 1926. 1,571,682
J. F. O'CONNOR
FRICTION SHOCK ABSORBING MECHANISM
Filed Sept. 16, 1922 3 Sheets-Sheet 3
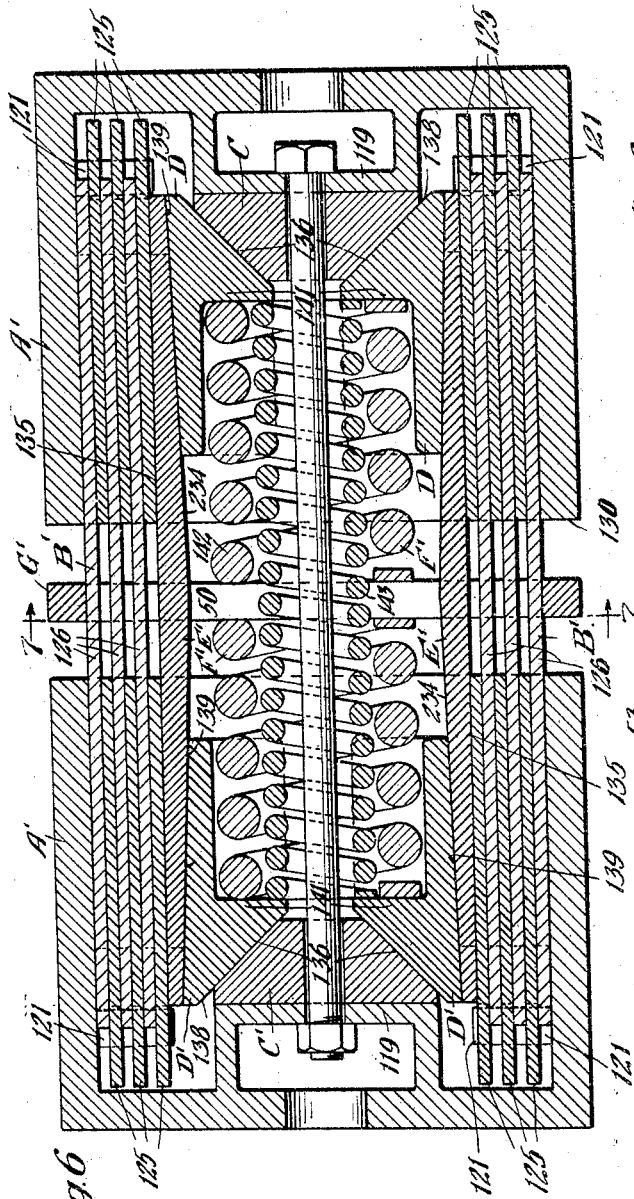
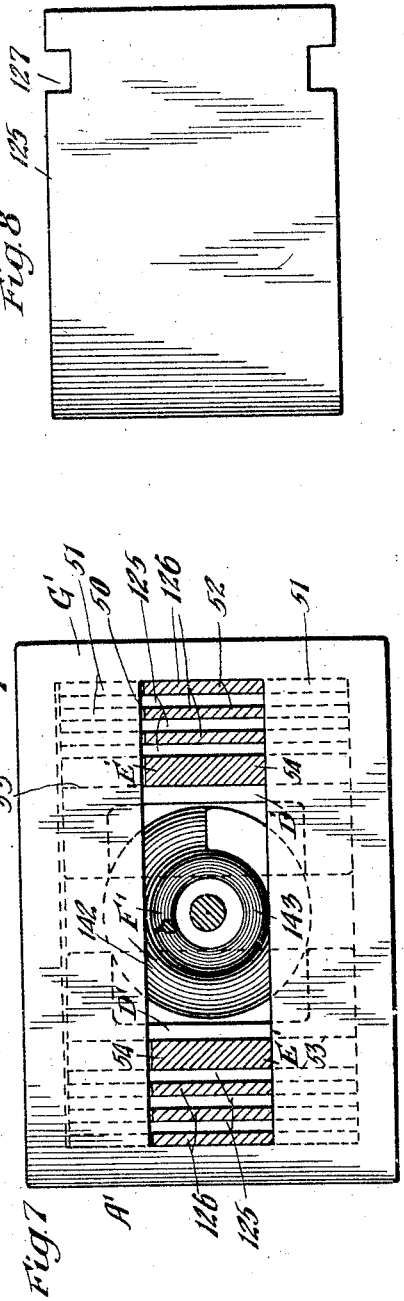
Witnesses
Wm. Geiger
Inventor
John F. O'Connor
By Geo. I. Haight
His Atty.

Patented Feb. 2, 1926.

1,571,682

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed September 16, 1922. Serial No. 588,572.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

My invention relates to improvements in friction shock absorbing mechanisms.

One object of my invention is to provide a friction shock absorbing mechanism, more particularly adapted for railway draft rigging, wherein is obtained a high capacity due to large frictional areas, and wherein a differential wedge action is made use of to assure a quick and positive release of a plurality of intercalated friction plates.

Other objects of the invention will more clearly appear from the description and claims hereinafter following.

In the drawings forming a part of this specification, Fig. 1 is a horizontal longitudinal sectional view of a portion of a draft rigging showing my improved shock absorbing mechanism in connection therewith. Fig. 2 is a vertical longitudinal section on the line 2—2 of Fig. 1. Fig. 3 is a transverse, vertical sectional view, substantially on the line 3—3 of Fig. 1. Fig. 4 is a vertical longitudinal sectional view through the end of a follower casing showing the manner of connecting the friction plates to the casing. Fig. 5 is a perspective view of a tapered element used in connection with my shock absorbing mechanism. Fig. 6 is a horizontal sectional view similar to Fig. 1, showing a modified form of my improvement. Fig. 7 is a transverse vertical sectional view, substantially on the line 7—7 of Fig. 6. And Fig. 8 is a side view of a movable friction plate used in the modified form of the invention illustrated in Figs. 6 and 7.

In said drawings, 10—10 indicate channel-shaped center or draft sills to the inner faces of which are secured front stop lugs 11 and rear stop lugs 12. A portion of the draw bar is shown at 13 to which is attached a U-shaped yoke 14. The shock absorbing mechanism proper, including front and rear follower casings, is disposed within the yoke 14 and the movable parts of the draft rigging are supported by the detachable saddle plate 15.

The embodiment of my improved shock absorbing mechanism shown in Figs. 1 to 5, inclusive, comprises front and rear follower casings A—A, friction plates B—B, wedge blocks C—C, wedge shoes D—D, tapering elements E—E and a spring resistance F.

The follower casings A are of similar construction and comprise horizontally extending upper and lower walls 16, and vertically extending side walls 17 connected by vertically extending rear walls 18. The rear walls 18 of the front and rear follower casings A co-act respectively with the front stop lugs 11 and the rear stop lugs 12. Each of the follower casings A is provided with an abutment 19 inwardly projecting from the rear wall thereof. The abutments 19 are of generally rectangular outline being somewhat greater in width than in height and form means for sustaining the wedge blocks C. As will be seen upon reference to Fig. 1, each abutment 19 is located centrally of the wall 18 of the casing A, and is spaced from the side walls 17, thereby providing recesses 20 for receiving the ends of the friction plates B. Each of the casings A is provided with means for holding the plates connected therewith, said means comprising ribs 21 projecting upwardly and downwardly from the lower and upper walls 16, respectively, and extending inwardly from the side walls 17, but having their ends spaced from the side walls 22 of the abutment 19 to provide a clearance space to permit the insertion of the ends of the friction plates so that the same may be connected to the ribs 21. Upon reference to Fig. 2, it will be noted that the casings A are also provided with short ribs 23 connected with the upper and lower walls 16, respectively, and extending longitudinally thereto. The ribs 23 are of a length equal to the abutment 19 and the outer faces 24 thereof provide additional supports for the wedge blocks C.

The friction plates B are arranged within the casings A and comprise two oppositely arranged groups. As herein shown, the groups of plates B each comprise three plates 25, and three plates 26, the plates 25 and 26 being alternated, with a plate 25 of each group arranged outermost in contact with the inside face of the wall 17 of the casing A. The plates 25 of each group are herein shown as connected to the front follower A and the plates 26 as connected with the rear follower A. The plates 25 and 26 are of similar construction and as best shown in Fig. 4, each of the plates 25 is provided with recesses 27 at the upper and lower edges thereof to engage with the ribs 21 of the casings A to thereby connect the plates with the casings so that the same will be moved outwardly therewith when the casings are relatively moved. As clearly shown in Figure 4, the recesses 27 are slightly larger than the ribs 21, there being sufficient play to permit a slight relative movement of the followers and plates. The plates 25 and 26 have the ends opposite to those connected to the casings A provided with upper and lower cut-out portions 28, as shown in Fig. 4, thereby providing the same with a narrow extension 29 of a width adapted to pass between the upper and lower faces of the ribs 21 so that the ends of the plates may closely approach the end walls 18 of the casings. In this connection, it should be noted that the plates 25 and 26 are of such a length and have their ends 29 so spaced from the walls 18 in the normal position of the parts that this spacing will be greater than the space between the ends 30 of the walls 17 of the casings A. By this arrangement the end walls 30 of the casings A will abut before the ends 29 of the plates contact with the walls 18, thereby causing the casings A to receive the full load when the shock absorbing mechanism has been completely compressed.

Arranged between the two groups of friction plates B and in contact with the innermost plates 26 thereof, are two similar oppositely arranged tapering friction elements E. As shown in Fig. 5, each of the tapering friction elements E comprises a rectangular plate 31 provided with a vertically extending centrally located, inwardly projecting web 32. As shown in Fig. 1, the web 32 of each plate is of such a width that when the parts are assembled, a space 33 will be left between the adjacent ends of the webs to accommodate a longitudinally extending retaining bolt 34. The outer face 35 of the plate 31 of the tapering element E extends parallel to the longitudinal axis of the shock absorbing mechanism, and inner face of the wall 31 is oppositely inclined outwardly from the central rib 32 toward the opposite ends of the plate E, as indicated by 134, thus providing oppositely extending faces slightly outwardly inclined with reference to the longitudinal axis of the shock absorbing mechanism. Upon reference to Fig. 3, it will be seen that the plates E are of a height equal to the height of the friction plates 25 and 26.

The wedges C are arranged at opposite ends of the shock absorbing mechanism and are adapted to bear on the abutments 19 of the casings A. Each of the wedge blocks C is provided with vertical inwardly inclined oppositely located wedge faces 36. As shown in Fig. 2, the rear faces 37 of the wedge blocks C bear on the abutments 19 at the center thereof, and have their upper and lower ends bearing on the abutment shoulders 24 of the ribs 23, thus providing a three-point support for the wedge blocks. Each of the wedge blocks C has a central perforation 38′ to receive the retaining bolt 34.

Interposed between the wedge blocks C and the inner inclined faces of the tapering plates E—E, is a pair of wedge shoes D. Each of the wedge shoes D has an inclined wedge acting face 38 co-acting with the corresponding wedge face 36 of the wedge block C and an outer wedge face 39 co-acting with the inclined inner face 134 of the tapering plate E. Upon reference to Fig. 1, it will be seen that the wedge shoes are thus provided with solid end portions of triangular shape in cross-section. The wedge shoes have their inner rear ends recessed as shown at 40 to provide abutments 41 to receive the rear ends of the springs.

The spring resistance F comprises tandem arranged outer relatively heavy springs 42—42 and tandem arranged relatively lighter inner springs 43—43. The springs 42 and 43 are interposed between the webs 32 on the tapering plates E and the abutments 41 on the wedge shoes, thus holding the wedge shoes in contact with the wedge blocks C.

The casings A are perforated as shown at 44 to provide for the insertion of the retaining bolt 34 which passes through apertures 45 in the abutment 19, apertures 38 in the wedge blocks C and through the inner spring coils 43. The bolt 34 has its head in contact with the inner wall of one of the hollow abutments 19 and the nut thereof in contact with the inner wall of the other hollow abutment 19, thereby retaining the parts of the draft rigging in assembled relation. If desired, the springs 42 and 43 may be held under a slight compression by the retaining bolt 34, thus compensating for any wear that may occur in the wedge blocks, wedge shoes and tapering plates.

In the operation of my shock-absorbing mechanism, assuming that the front follower A is being moved rearwardly toward the rear follower during buff, the wedges C will cause the wedge shoes D, opposed by the springs 42 and 43, to move laterally thereby putting the friction plates and the tapering plates under pressure, augmenting the frictional resistance between the same. During the initial action of the mechanism, the play between the ribs 21 of the followers and plates will be taken up, whereupon the plates will move in unison with the followers, the plates 25 being moved rearwardly relatively to the plates 26 against the frictional resistance due to the wedging action. During the continued rearward movement of the wedge C, the shoes D associated with the front follower casing will be moved longitudinally relatively to the tapering plates E, thus causing a slight inward movement of the wedge shoes due to the wedging action of the faces 134 and 39, thereby causing the faces 38 to slide inwardly relatively to the faces 36 causing an additional longitudinal movement of the shoes D, and further compressing the springs 42 and 43. During this movement of the wedge and wedge shoes, the tandem springs 42—42 and 43—43 will be equally compressed, and the tapering elements E moved longitudinally a distance equal to approximately half of the longitudinal movement of the front follower A. During the draft action of the shock absorbing mechanism, the operation is similar to that just described, the only difference being that the rear follower A is moved relatively to the front follower A. Upon removing the pressure on the shock absorbing mechanism, the wedge shoes D will be caused to move outwardly first, by the expanding of the springs 42 and 43, thus causing a prompt release of the wedging mechanism, and an immediate decrease of the pressure on the friction plates, which remain stationary until the play between the ribs 21 and the plates is taken up, whereupon the plates will be restored to original position by the followers.

The modification shown in Figs. 6 to 8 inclusive, comprises casings A'—A', friction plates B'—B', wedge blocks C'—C', wedge shoes D'—D', tapering plates E'—E'; spring resistance F'; and a floating carrier plate G'.

In the modified form shown in Figs. 6 to 8 inclusive, the front and rear follower casings A'—A' are substantially the same construction as the follower casings A—A of the preferred embodiment. Each casing A' is provided with an abutment 119 to receive the wedge, and ribs 121 to connect with the friction plates similar to the equivalent parts of the preferred construction.

The wedges C' and the wedge shoes D' are exactly the same as the wedge blocks C and the wedge shoes D of the preferred form.

Within each of the casings A' are mounted two sets of oppositely located friction plates 125. Each of the plates 125, as best shown in Fig. 8 is of a height equal to the inner height of the casings A' and of a length slightly less than the distance between the rear wall of the casing A' and the outer end of the same. Each of the plates 125 is provided at its upper and lower edges with recesses 127 adapted to be engaged with the corresponding ribs 121, on the upper and lower inside walls of the casing A'. Upon reference to Fig. 6, it will be seen that when the plates 125 are in assembled relation with the casings A', the outer free ends of the plates 125 will terminate in line with the end walls 130 of said casings.

Interposed alternately between the plates 125 is a series of plates 126 fixed to a plate G' centrally located between the ends of the casings A'.

As best shown in Fig. 7, the plate G' is of generally rectangular form corresponding in dimensions to the end walls of the casings A'. The plate G' is provided with a transversely extending centrally located aperture 50 of a length equal to the distance between the inner faces of the side walls of the casings A'. The plates 126 are slotted vertically at their upper and lower central portion as shown at 51 leaving a centrally connecting web 52. The slots 51 are of substantially the same width as the thickness of the plate G' and the connecting webs 52 are of a height slightly less than the vertical width of the recess 50. When the plates 126 and the plate G' are assembled, the webs 52 are received within the recess 50 and the walls of the slots 51 abut the adjacent faces of the plate G', thereby holding the plates 126 in relatively fixed relation to the plate G'.

The tapering plates E' and E' are also provided with upper and lower vertically extending centrally located slots 53 corresponding in width to the thickness of the plate G' thereby leaving a centrally located web 54 of a height slightly less than the height of the recess 50. The tapering plates E' are held to the plate G' by the slots and the web in a similar manner as the plates 126 are held. Upon reference to Fig. 6, it will be seen that the tapering plates E' have an outer face 135 disposed parallel to the longitudinal axis of the shock absorbing mechanism and inner faces 234 extending oppositely from the center of the plate E' and inclined slightly with reference to the longitudinal axis of the mechanism, thus providing the plate E' with oppositely disposed wedging surfaces diverging inwardly slightly with reference to the outer face 135.

The wedge shoes D' are provided with wedge faces 138 and 139, co-acting with the wedge faces 136 and 234 of the wedge blocks C' and the tapering plates E' respectively, in a manner similar to the corresponding wedge faces on the shoes D of the preferred construction. Each of the wedge shoes is provided with an abutment 141 to receive the end of the spring resistance F'.

The spring resistance comprises tandem arranged outer relatively heavy springs 142 abutting the inner ends of the shoes D' and the plate G', and an inner relatively lighter spring 143 extending through the recess 50 of the plate G' and having its opposite ends abutting the inner walls 141 of the opposite sets of shoes D'.

In the operation of the modified form of the mechanism shown in Figs. 6 to 8 inclusive, assuming that the front follower A is being moved toward the rear follower A' during a buffing action, the wedges C' will cause the wedge shoes to move apart in a similar manner to that described in connection with the preferred construction, causing pressure to be applied to the groups of friction plates at opposite ends of the mechanism. It should also be noted that there will be an additional inward movement of the shoes D' similar to the movement of the shoes D, due to the wedging action between the shoes and the tapering plates, thereby causing an additional longitudinal movement of the shoes D' relatively to the plates E', and further compression of the spring resistance and an increase in wedging pressure. The plate G', which carries the friction plates 126 and the tapering plates E', is in the nature of a floating member being held between the springs 142 and being moved during the compression of the same a distance approximately one-half of the distance that the front follower A' moves due to the combined action of the springs and the friction created between plates 126 and the groups of plates 125 carried by the front and rear followers. As the wedging pressure is substantially equal at opposite ends of the mechanism the opposition to movement of the plates 126 due to frictional contact with the plates 125 of the rear follower is substantially equal to the force tending to move the plates 126 due to frictional contact with the plates 125 of the front follower. As the plates 126 are thus held against full movement with the front follower A', it will be obvious that the plates 125 which are moving with the front follower will be moved relatively to the plates 126, and that the plates 126, on account of their movement with the floating member G' will be moved relatively to the plates 125 connected to the rear follower A'. It will thus be seen that frictional resistance is set up between the plates 125 of the front follower moving relatively to the plates 126, and the plates 126 moving relatively to the plates 125 of the rear follower. In release, the operation of the mechanism will be substantially the same as is the case in the pre-referred embodiment.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism; the combination with a plurality of groups of intercalated friction plates; front and rear followers for relatively moving said plates; a spring resistance between said groups of plates; a tapered friction element interposed between each group of plates and the spring resistance and adapted to be moved by said spring resistance; and means for placing said plates under lateral pressure, said means including wedging means at opposite ends of said spring resistance co-acting with said elements, each of said wedging means being interposed between a follower and the adjacent end of the spring resistance whereby said intercalated plates are subjected to wedging pressure during the compressive action of the mechanism.

2. In a friction shock absorbing mechanism; the combination with a front and a rear follower; of a plurality of groups of relatively movable intercalated friction plates between said followers; means opposing lateral movement of said groups of plates; a longitudinally extending spring resistance arranged between said groups of plates; a tapered friction element between each group of plates and the spring resistance, each of said elements being provided with means for engaging the spring resistance, whereby the element is adapted to be moved with said spring resistance; and wedge-acting means between each follower and the adjacent end of the spring resistance for creating pressure on said elements and groups of plates during the compressive action of the mechanism.

3. In a friction shock absorbing mechanism, the combination with a plurality of groups of intercalated friction plates; of a spring resistance arranged between said groups of plates; a floating tapered friction element between each group of friction plates and the spring resistance, each of said elements being provided with means for engaging the spring resistance; means for limiting lateral movement of said plates; and wedge-pressure-transmitting means at opposite ends of said spring resistance and co-acting with said elements to put the groups of plates and the elements under pressure during the compressive action of the shock absorbing mechanism.

4. In a friction shock absorbing mechanism; the combination with front and rear followers; of a spring resistance between said followers, said spring resistance comprising spring elements arranged in tandem; wedge-pressure transmitting means at opposite ends of said spring resistance, interposed between the same and the adjacent follower; groups of intercalated friction plates on opposite sides of said spring resistance; means opposing lateral outward movement of said groups of plates; and a floating wedge element interposed between said spring resistance and a group of plates, said element having a portion received between said tandem arranged springs.

5. In a friction shock absorbing mechanism; the combination with a plurality of friction elements; of front and rear followers, having means thereon limiting lateral movement of said elements; a spring resistance associated with said elements, said spring resistance comprising tandem arranged springs; abutment means rigidly connected with each of said elements and interposed between said tandem arranged springs; wedge-acting means at opposite ends of said spring resistance co-acting with said elements and followers.

6. In a friction shock absorbing mechanism; the combination with front and rear follower casings; of oppositely arranged sets of friction plates carried by each follower, said plates being embraced by said casing and held against lateral movement thereby, the sets of plates connected with one follower being movable relatively to the sets of plates carried by the other follower; a spring resistance between said sets of plates, said spring resistance comprising tandem arranged springs; friction elements co-acting with said sets of plates, said friction elements each including abutment means and said abutment means being interposed between said tandem arranged springs; and wedge-acting means arranged at opposite ends of said spring resistance co-acting with said followers and said friction elements.

7. In a friction shock absorbing mechanism, the combination with front and rear follower casings; of oppositely arranged sets of friction plates housed within and carried by said follower casings and engaging the interior surfaces thereof, the sets of plates carried by one follower being movable relatively to the sets of plates carried by the other follower; a spring resistance between said sets of plates, said spring resistance comprising tandem arranged springs; friction wedge elements co-acting with said sets of plates, said elements each including an abutment member and said member being interposed between said tandem arranged springs; and wedge-acting means at opposite ends of said spring resistance co-acting with said followers and elements, each wedge-acting means including a wedge block engaging one of said followers and wedge-shoes interposed between said block and said elements.

8. In a friction shock absorbing mechanism; the combination with front and rear follower casings; of oppositely arranged sets of friction plates housed within and carried by said follower casings, said plates being held against lateral outward movement by said casings, the sets of plates carried by one follower being movable relatively to the sets of plates carried by the other follower; a spring resistance between said sets of plates, said spring resistance comprising tandem arranged springs; friction wedge elements co-acting with said sets of plates, said elements each including an abutment member and said abutment member being interposed between said tandem arranged springs; and wedge-acting means at opposite ends of said spring resistance, co-acting with said followers and elements, each wedge-acting means including a wedge block having opposite wedge faces and a wedge shoe interposed between each wedge face and the adjacent wedge element.

9. In a friction shock absorbing mechanism, the combination with oppositely arranged hollow end follower casings normally spaced and adapted to move relatively toward and from each other; of longitudinally arranged spring means disposed centrally and substantially housed by said follower casings, said plates being limited against lateral outward movement by said casings; longitudinally arranged friction plates adapted for relative movement upon relative movement of the follower casings, said plates being divided into two groups on opposite sides of said spring resistance; duplicate sets of wedge-friction elements at each end of the spring resistance; and friction means interposed between each group of plates and the end sets of wedge-friction elements, said wedge elements having friction faces inclined at an angle relatively acute with respect to the axis of the mechanism.

In witness that I claim the foregoing I have hereunto subscribed my name this 28th day of Aug. 1922.

JOHN F. O'CONNOR.